(12) United States Patent
Sugita

(10) Patent No.: US 8,750,606 B2
(45) Date of Patent: Jun. 10, 2014

(54) DEVICE LINK PROFILE CREATION METHOD, COMPUTER-READABLE MEDIUM STORING PROGRAM, AND DEVICE LINK PROFILE CREATION APPARATUS

(75) Inventor: Tsuyoshi Sugita, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 312 days.

(21) Appl. No.: 13/168,678

(22) Filed: Jun. 24, 2011

(65) Prior Publication Data

US 2012/0002870 A1    Jan. 5, 2012

(30) Foreign Application Priority Data

Jun. 30, 2010    (JP) .................................. 2010-148500

(51) Int. Cl.
```
G06K 9/00       (2006.01)
G06F 15/00      (2006.01)
G06F 3/12       (2006.01)
H04N 1/40       (2006.01)
G03F 3/08       (2006.01)
G09G 5/02       (2006.01)
```

(52) U.S. Cl.
USPC ........... 382/162; 358/1.9; 358/1.15; 358/448; 358/518; 358/523; 345/604

(58) Field of Classification Search
None
See application file for complete search history.

(56) References Cited

U.S. PATENT DOCUMENTS

| | | | |
|---|---|---|---|
| 2004/0184054 A1 | 9/2004 | Takahira et al. | |
| 2005/0046640 A1 | 3/2005 | Newman et al. | |
| 2005/0225785 A1* | 10/2005 | Hiramatsu | 358/1.9 |
| 2005/0270587 A1* | 12/2005 | Yamakawa et al. | 358/448 |
| 2008/0079966 A1 | 4/2008 | Thomas | |
| 2010/0265524 A1* | 10/2010 | Muramatsu | 358/1.9 |

FOREIGN PATENT DOCUMENTS

| | | |
|---|---|---|
| CN | 100355580 C | 12/2007 |
| JP | 2000-203097 | 7/2000 |
| JP | 2002-163098 | 6/2002 |
| JP | 2004-287660 | 10/2004 |
| JP | 2007-143042 | 6/2007 |
| JP | 2008-131207 | 6/2008 |

OTHER PUBLICATIONS

Notification of the First Office Action of the State Intellectual Property Office of People's Republic of China for Appl. No. 201110192333.5, Issue date Sep. 9, 2013, 7 pgs.

(Continued)

*Primary Examiner* — Amir Alavi
*Assistant Examiner* — Kenny Cese
(74) *Attorney, Agent, or Firm* — Squire Sanders (US) LLP

(57) ABSTRACT

A device link profile creation method including: storing a plurality of device link profiles in a storage unit with information about a first device profile which is used to create one of the plurality of device link profiles, for each of the plurality of device link profiles; storing the first device profile in the storage unit; and performing control by a control unit to: when the first device profile is updated to be a second device profile, detect the second device profile; detect a first device link profile which is created by using the first device profile, as a device link profile to be updated; automatically create a second device link profile by using the second device profile; and update the detected device link profile to be updated by replacing the device link profile to be updated with the created second device link profile.

11 Claims, 12 Drawing Sheets

(56) References Cited

OTHER PUBLICATIONS

Translation of the Notification of the First Office Action of the State Intellectual Property Office of People's Republic of China for Appl. No. 201110192333.5, Issue date Sep. 9, 2013, 11 pgs.

Notification of Reasons for Refusal issued by JPO for Appl. No. 2010-148500, mailed Oct. 8, 2013, 2 pgs.

Translation of the Notification of Reasons for Refusal issued by JPO for Appl. No. 2010-148500, mailed Oct. 8, 2013, 4 pgs.

Extended European Search Report for EP 11172252.6, dated Apr. 22, 2013, 9 pgs.

* cited by examiner

CONFIRMATION OF DEVICE LINK PROFILE UPDATE

A device link profile which uses the updated device profile is detected.
Do you allow the device link profile to be recalculated by using the updated device profile?

| YES | NO | LATER |
| B11 | B12 | B13 |

FIG. 7

COMPLETION OF DEVICE LINK PROFILE UPDATE

The device link profile which requires an update is recalculated and registered in the controller.

OK

DEVICE LINK PROFILE CREATION METHOD, COMPUTER-READABLE MEDIUM STORING PROGRAM, AND DEVICE LINK PROFILE CREATION APPARATUS

BACKGROUND OF THE INVENTION

1. Field of the Invention

The present invention relates to a device link profile creation method, a computer-readable medium storing a program, and a device link profile creation apparatus.

2. Description of Related Art

Examples of a device which handles image data include a digital camera, a scanner, a monitor (a display device of a computer), and a multi-functional peripheral (MFP). Since each of these devices has its unique color space, the color space of image data needs to be converted when the image data is exchanged among these devices. As a unified system for managing such conversion of the color space, there is a color management system (hereinafter referred to as CMS) described in Japanese Patent Application No. H11-9872, for example.

In general, a CMS means a system for managing color conversion by using a profile in conformity with a rule of International Color Consortium (ICC).

Hereinafter, a CMS which uses a device link profile (hereinafter referred to as a DLP) and a device profile (hereinafter referred to as a DP) is described, in particular, among the profiles in conformity with the rule of the ICC.

When performing color conversion from the color space of inputted data into the color space of outputted data, the CMS which uses a DLP is capable of performing direct color conversion without going through color conversion into profile connection space (PCS). The CMS which uses a DLP is superior to other CMS which does not use a DLP in color retention, and enables high-speed color conversion.

The DLP is created by using a source profile and a destination profile.

The source profile is a profile for performing color conversion from the color space of inputted data into the color space of the PCS. The source profile can be created based on printed material, for example. Some source profiles are offered by ink manufacturers or the like. The destination profile is a profile for performing color conversion from the color space of the PCS into the color space of outputted data. The destination profile is provided individually for an image forming apparatus such as an MFP.

The DP means data including information about a color characteristic of each device including various types of input devices and output devices. As the data included in the DP, there is a source profile and a destination profile. Hereinafter, the term "DP" is used as a general term for the source profile and the destination profile.

In the CMS which uses a DLP, when a DP is updated, the DLP which is created by using the updated DP needs to be updated. Examples of means for helping such a DLP update include a system for notifying a user that a DLP update is necessary when the DLP update is necessary, as described in Japanese Patent Application No. 2000-357932.

A DLP update accompanying a DP update has conventionally been performed in such a way that a user manually specifies a DLP which uses an updated DP. For this reason, a user needs to confirm manually the contents of all the DLPs which are registered in the controller of the CMS, and needs to check whether or not the updated DP is used for each DLP.

In addition, after specifying the DLP which uses the updated DP, a user needs to create a DLP manually for updating the specified DLP by using the updated DP. Still further, a user needs to replace the DLP before the update with the created DLP for updating manually.

These various works required for the DLP update are very troublesome and impose a great burden on a user.

Moreover, the workload required for the DLP update increases as the number of DLPs registered in the controller increases. For this reason, the DLP update in the CMS where a number of DLPs are registered is extremely troublesome, and imposes an enormous burden on a user.

SUMMARY OF THE INVENTION

In view of the problems mentioned above, the present invention is made in order to reduce the burden accompanying a DLP update on a user.

To achieve the above mentioned object, a device link profile creation method reflecting one aspect of the present invention includes: storing a plurality of device link profiles in a storage unit with information about a first device profile which is used to create one of the plurality of device link profiles, for each of the plurality of device link profiles; storing the first device profile in the storage unit; and performing control by a control unit to: when the first device profile is updated to be a second device profile, detect the second device profile; detect a first device link profile among the plurality of device link profiles, the first device link profile being created by using the first device profile, as a device link profile to be updated; automatically create a second device link profile by using the second device profile; and update the detected device link profile to be updated by replacing the device link profile to be updated with the created second device link profile.

Preferably, the device link profile creation method further includes setting an update detection rule for a device profile by allowing a choice, by the control unit, of whether to detect a device profile, creation time information of which is changed, as the second device profile, or to detect a device profile, the creation time information of which is changed, and which includes a change at a binary level after the creation time information is changed, as the second device profile, wherein the control unit detects an update of the first device profile into the second device profile by using the update detection rule for a device profile.

Preferably, the first device profile includes a source profile and a destination profile; and when at least any one of the source profile and the destination profile is updated, the control unit detects an update of the source profile and/or the destination profile, and the control unit detects the first device link profile among the plurality of device link profiles, the first device link profile being created by using the updated source profile and/or the updated destination profile, as the device link profile to be updated.

Preferably, each of the plurality of device link profiles has attribute information which is individually set; and the control unit sets the attribute information, which is set for the first device link profile detected as the device link profile to be updated, for the second device link profile created by using the second device profile.

Preferably, the device link profile creation method further includes allowing a setting, by the control unit, of the attribute information of the second device link profile created by using the second device profile.

Preferably, the device link profile creation method further includes notifying that an update of the device link profile to be updated is completed, by the control unit.

Preferably, the device link profile creation method further includes allowing a choice, by the control unit, of whether to automatically create the second device link profile by using the second device profile or not, wherein when a choice not to automatically create the second device link profile by using the second device profile is made, the control unit does not create the second device link profile by using the second device profile.

Preferably, the device link profile creation method further includes allowing a choice, by the control unit, of whether to immediately create the second device link profile by using the second device profile or not, wherein when a choice not to immediately create the second device link profile by using the second device profile is made, the control unit allows the choice again of whether to immediately create the second device link profile by using the second device profile or not, after a predetermined period of time passes.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is an explanatory view illustrating an example of a DP creation screen;

FIG. 6 is an explanatory view illustrating an example of a confirmation dialog;

FIG. 7 is an explanatory view illustrating an example of an update completion message;

DESCRIPTION OF THE PREFERRED EMBODIMENTS

In the following, an embodiment of the present invention is described in detail with reference to the drawings.

Figure 1:
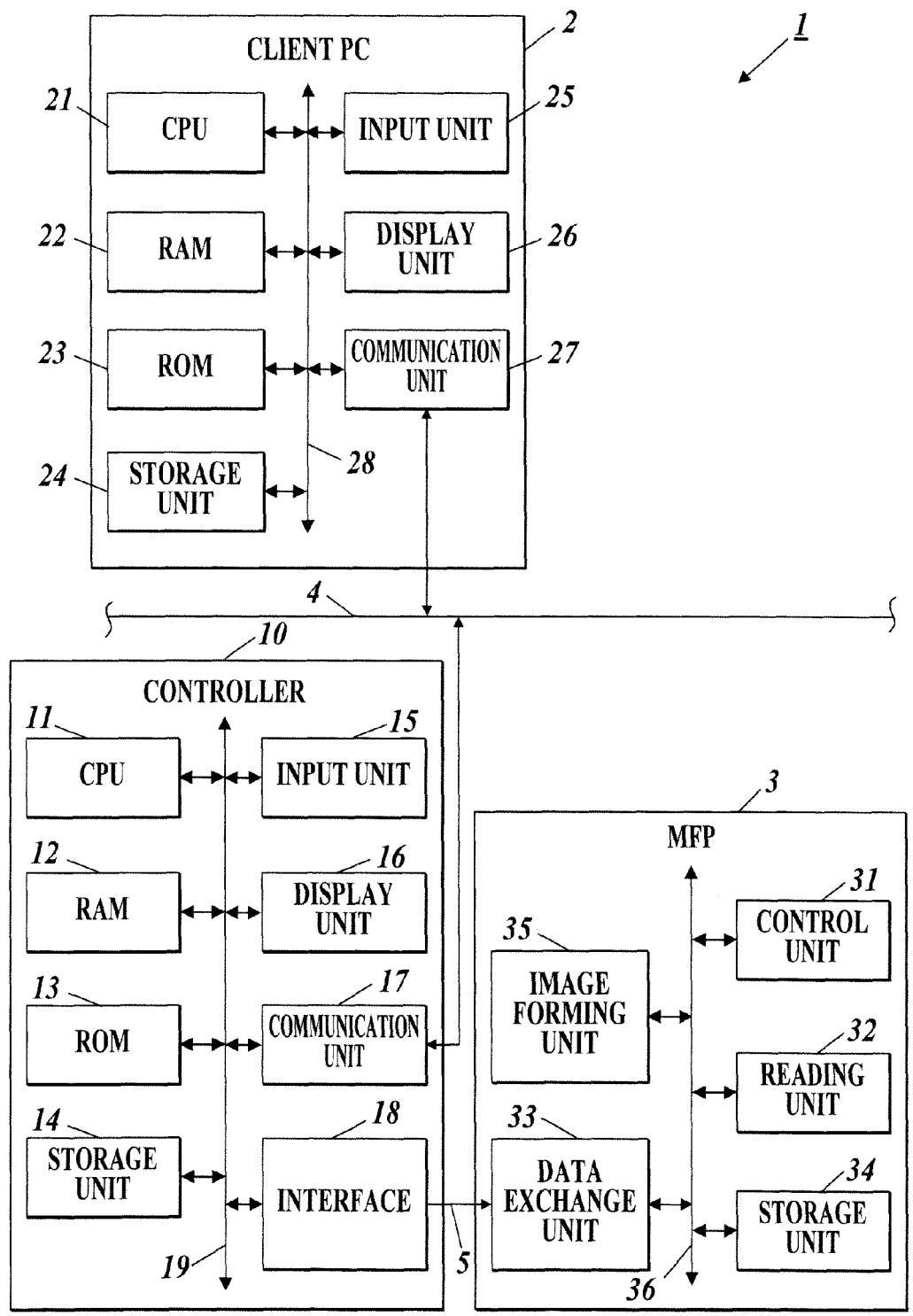
FIG. 1 is a block diagram illustrating a CMS including a controller which functions as a DLP creation apparatus according to the present invention.

In FIG. 1, a color management system (CMS) 1 including a controller 10 which functions as device link profile (DLP) creation apparatus according to the present invention is described. The CMS 1 includes a client PC 2, an MFP 3, and the controller 10.

The client PC 2 includes a CPU 21, a RAM 22, a ROM 23, a storage unit 24, an input unit 25, a display unit 26, and a communication unit 27. The units are connected to each other with a bus 28.

The CPU 21 performs the operating control of the client PC 2 in accordance with programs, data, and the like, expanded in the RAM 22, in cooperation with programs stored in the ROM 23.

The RAM 22 stores data expanded by processing performed by the CPU 21, data created temporarily by the processing, and the like.

The ROM 23 stores programs, data, and the like, read by the CPU 21.

The storage unit 24 stores the programs, the data, and the like, read by the CPU 21. The storage unit 24 is a storage device capable of rewriting the programs, the data, and the like. The storage unit 24 is composed of, for example, a flash memory, a hard disk drive (HDD), other rewritable storage devices, a combination of these of the storage devices, or the like.

The input unit 25 receives an input operation to the client PC 2. The input unit 25 is composed of, for example, a keyboard, a mouse, other input devices, a combination of these of the input devices, or the like. The input unit 25 receives an input operation by a user and inputs the inputted operation to the client PC 2.

The display unit 26 displays the outputs in accordance with the processing performed by the CPU 21. The display unit 26 is composed of, for example, a picture tube, a liquid crystal display device, an organic electroluminescence (EL) display, other display devices, a combination of these of the display devices, or the like.

The communication unit 27 exchanges data with an external device. The communication unit 27 includes, for example, a communication device such as a network interface card (NIC), and exchanges data with an external device via a line. The exchange of data between the communication unit 27 and the external device may be performed through wire or may be performed without wire, and any protocol and other conditions (such as standards) about a connection form may be applied. In the present embodiment, the communication unit 27 communicates with the controller 10 via a network line 4 of Ethernet™.

The controller 10 includes a CPU 11, a RAM 12, a ROM 13, a storage unit 14, an input unit 15, a display unit 16, a communication unit 17, and an interface 18. These units are connected to each other with a bus 19.

The CPU 11 performs the operating control of the controller 10 in accordance with programs, data, and the like, expanded in the RAM 12, in cooperation with programs stored in the ROM 13.

The RAM 12 stores data expanded by processing performed by the CPU 11, data created temporarily by the processing, and the like.

The ROM 13 stores programs, data, and the like, read by the CPU 11.

The storage unit 14 stores the programs, the data, and the like, read by the CPU 11. The storage unit 14 is a storage device capable of rewriting the programs, the data, and the like. The storage unit 14 is composed of, for example, a flash memory, a hard disk drive (HDD), other rewritable storage devices, a combination of these of the storage devices, or the like. The storage unit 14 stores device profiles (DPs) and device link profiles (DLPs).

The input unit 15 receives an input operation to the controller 10. The input unit 15 is composed of, for example, a keyboard, a mouse, other input devices, a combination of these of the input devices, or the like. The input unit 15 receives an input operation by a user and inputs the inputted operation to the controller 10.

The display unit 16 displays the outputs in accordance with the processing performed by the CPU 11. The display unit 16 is composed of, for example, a picture tube, a liquid crystal display device, an organic electroluminescence (EL) display, other display devices, a combination of these of the display devices, or the like.

The communication unit 17 includes, for example, a communication device such as a network interface card (NIC), and exchanges data with an external device via a line. The exchange of data between the communication unit 17 and the external device may be performed through wire or may be performed without wire, and any protocol and other conditions (such as standards) about a connection form may be applied. In the present embodiment, the communication unit 17 communicates with the client PC 2 via the network line 4 of Ethernet™.

The interface 18 is connected to an external device and exchanges data with the external device. The connection and the exchange of data between the interface 18 and the external device may be performed through wire or may be performed without wire, and any protocol and other conditions (such as standards) about a connection form may be applied. In the present embodiment, the exchange of data between the interface 18 and the MFP 3 is performed via a dedicated line 5. The interface 18 may be connected to a device other than the MFP 3.

The MFP 3 includes a control unit 31, a reading unit 32, a data exchange unit 33, a storage unit 34, and an image forming unit 35. The units are connected to each other with a bus 36.

The control unit 31 includes a computer which is composed of a CPU, a RAM, a ROM, and the like (not shown). The control unit 31 performs the operating control of the MFP 3 in accordance with programs, data, and the like, expanded in the RAM in such a way that the CPU works in cooperation with programs stored in the ROM.

The reading unit 32 reads an image. The reading unit 32 includes an image reading device such as an image scanner, and reads an image from a medium fixed on the image reading device to generate an image.

The data exchange unit 33 exchanges data with an external device.

The exchange of data between the data exchange unit 33 and the external device may be performed through wire or may be performed without wire, and any protocol and other conditions (such as standards) about a connection form may be applied. In the present embodiment, the exchange of data between the data exchange unit 33 and the controller 10 is performed via the dedicated line 5.

The storage unit 34 stores various types of data such as image data generated by the reading unit 32 and data inputted through the data exchange unit 33. The storage unit 34 is a storage device capable of rewriting the programs, the data, and the like. The storage unit 34 is composed of, for example, a flash memory, a hard disk drive (HDD), other rewritable storage devices, a combination of these of the storage devices, or the like.

The image forming unit 35 performs image formation (printing) based on image data generated by the reading unit 32, data inputted through the data exchange unit 33, and the like.

Examples of printing systems which may be introduced to the image forming unit 35 include an electrophotographic system, an ink-jet system, a thermal transfer system, an offset system, or the like. In the present embodiment, the image forming unit 35 is configured so as to perform image formation by using the electrophotographic system.

Figure 2:
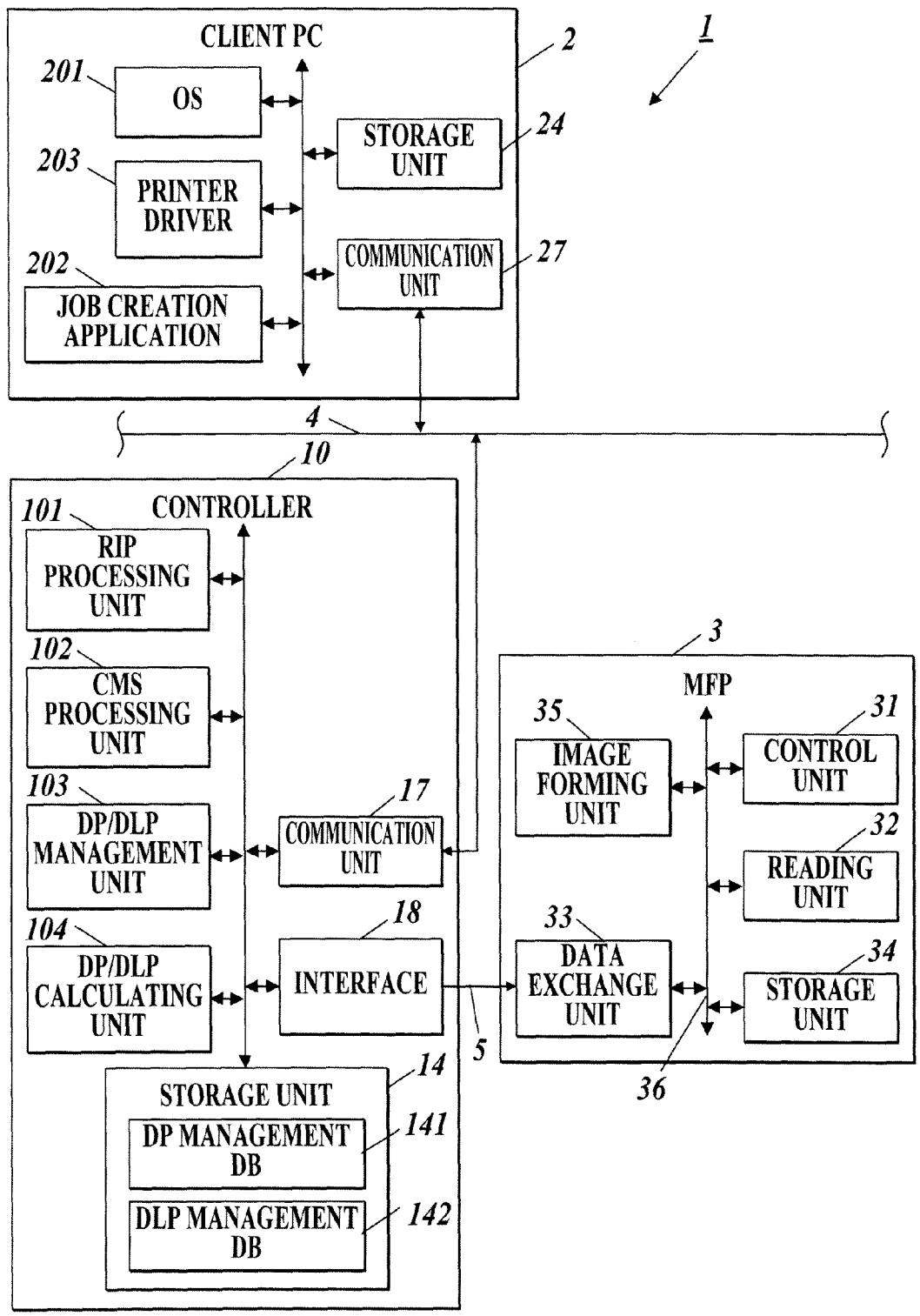
FIG. 2 is a function block diagram of the CMS.

FIG. 2 illustrates the function block diagram of the CMS 1.

The client PC 2 functions as an operating system (OS) 201, a job creation application 202, and a printer driver 203.

These functions are allowed by software processing performed by the CPU 21.

The OS 201 is a basic software for allowing programs corresponding to the job creation application 202, the printer driver 203, and other various functions, to operate.

The job creation application 202 generates original data to be printed by the MFP 3. Examples of original data include document data generated by a word-processing software, text data generated by a text editor, a bitmap generated by an image processing software, and image data in the form of JPEG or other forms.

The printer driver 203 produces a print job based on original data. The print job is the data for performing printing by the MFP 3. For the printer driver 203, software corresponding to the MFP 3 is used.

The print job is outputted to the controller 10 through the communication unit 27.

The controller 10 functions as a raster image processor (RIP) processing unit 101, a CMS processing unit 102, a DP/DLP management unit 103, and a DP/DLP calculating unit 104. These functions are allowed by software processing performed by the CPU 21.

The RIP processing unit 101 performs the RIP processing based on a print job. The RIP processing is the processing for analyzing a page description language (PDL) included in a print job and generating bitmap image data. The bitmap image data generated by the RIP processing is outputted to the MFP 3 through the interface 18. The MFP 3 performs printing based on the bitmap image data.

The CMS processing unit 102 performs color management processing. The color management processing in the present embodiment is the processing for determining a DLP to be used for color conversion processing. The color conversion processing is performed during the RIP processing. The CMS processing unit 102 reads a DLP from the storage unit 14 and transmits the DLP to the RIP processing unit 101.

Figure 3:
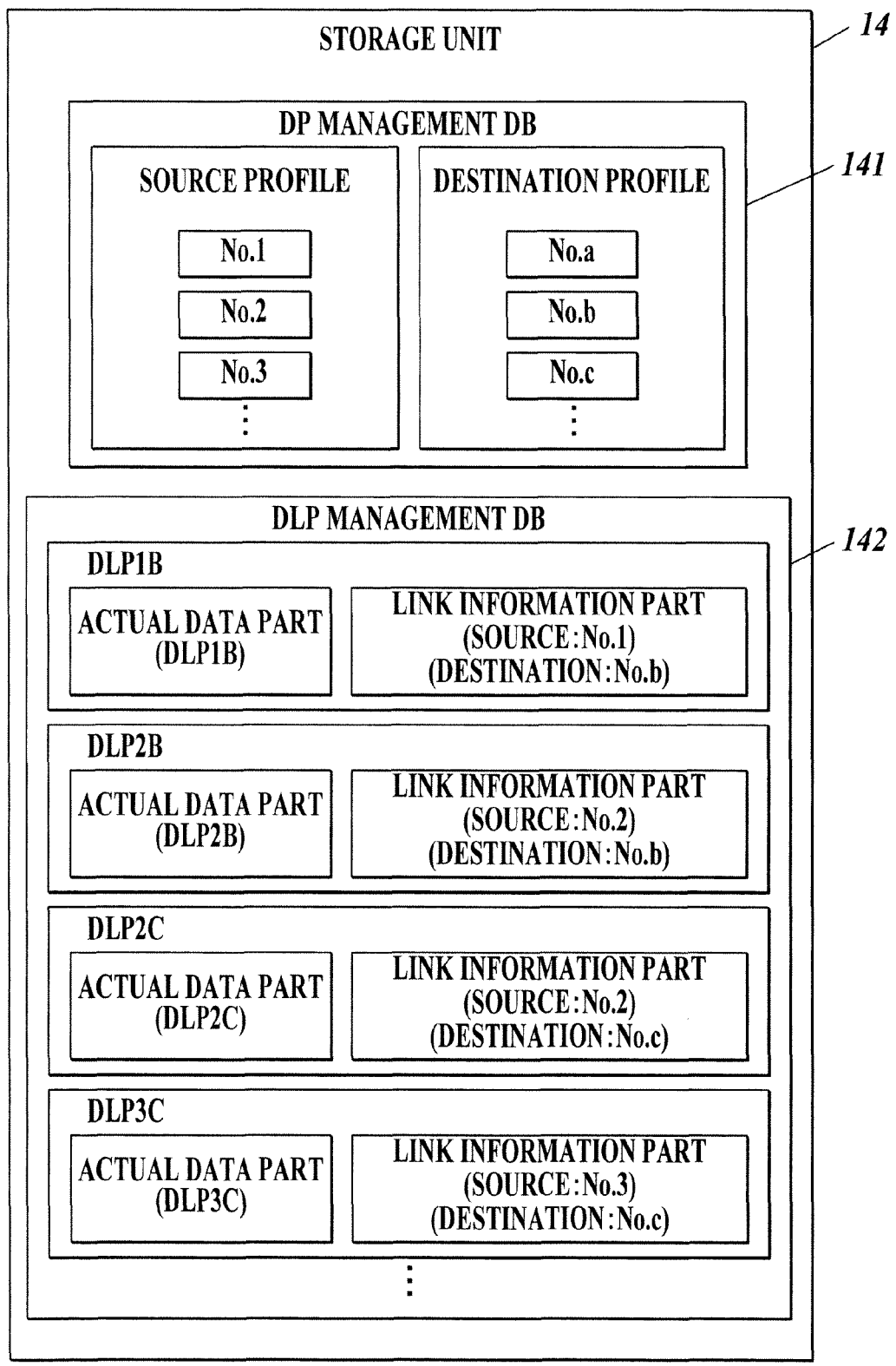
FIG. 3 is an explanatory diagram illustrating an example of a configuration of DPs and DLPs stored in a storage unit.

FIG. 3 shows an example of a configuration of DPs and DLPs stored in the storage unit 14.

The storage unit 14 includes a storage area which functions as a DP management database (DB) 141 and a DLP management DB 142.

The DP management DB 141 stores source profiles and destination profiles.

Each source profile and each destination profile have their own specific identification information. In the example shown in FIG. 3, identification information (ID number) such as "No. 1", "No. 2", and "No. 3" . . . is given to each source profile. Further, identification information (ID number) such as "No. a", "No. b", and "No. c" . . . is given to each destination profile.

The DLP management DB 142 stores a plurality of DLPs. Each DLP has its own specific identification information. In the example shown in FIG. 3, identification information such as "DLP1B", "DLP2B", "DLP2C", and "DLP3C" . . . is given to each DLP.

Each DLP has an actual data part and a link information part. The actual data part is the actual data of a DLP including information for performing color conversion by using the DLP. The link information part includes information showing the DP which is used to create the DLP. For example, the link information part of "DLP1B" shown in FIG. 3 includes information which shows that "DLP1B" is created by using the source profile of "No. 1" and the destination profile of "No. b". The link information part of another DLP also includes information showing a source profile and a destination profile which are used to create the DLP, in the same manner.

Each DP and the actual data part of each DLP are data files in binary format.

The identification information shown in FIG. 3 is merely an example, and any format can be applied to identification information as long as the identification information can identify a source profile and a destination profile, and a DLP. For example, the file name of a DP or DLP may be used as the identification information.

The DP/DLP management unit 103 manages DPs and DLPs stored in the storage unit 14.

First, the DP/DLP management unit 103 checks whether a DP or DLP is updated.

To each DP and each DLP, information of the time when the data file thereof is created (update date and time) is added, although not shown in FIG. 3. The DP/DLP management unit 103 holds an update date and time of each DP and each DLP. As to a DP or DLP, the update date and time of which is changed, whether or not the DP or DLP is updated can be determined depending on whether there is a change in the update date and time of the DP or DLP.

In addition, the DP/DLP management unit 103 has a function to check each DP and each DLP at a binary level. In other words, the DP/DLP management unit 103 can determine whether there is a difference between DPs or between DLPs based on an order of a binary number of a DP or the actual data part of a DLP as binary data. Examples of a concrete method for determining a difference between data files at a binary level include determination based on a hash value. In this case, the DP/DLP management unit 103 holds a hash value of each DP and each DLP. When a DP or DLP is changed, the DP/DLP management unit 103 obtains a hash value from the changed DP or the actual data part of the changed DLP, compares the obtained hash value with the hash value of the DP or the actual data part of the DLP before the change, and determines whether there is a difference between the hash values. The determination of existence of a difference between data files at a binary level may be performed by other methods.

The DP/DLP management unit 103 can determine whether a DP or DLP is updated or not based on whether there is a difference between data files at a binary level, as to the DP or DLP, the update date and time of which is changed.

Whether using a "simple mode" where the existence of an update of a DP or DLP is determined based on only the creation time information of each data file, or using a "detail mode" where the existence of an update of a DP or DLP is determined based on the creation time information of each data file and based on a determination result at a binary level, is preliminarily set as an update detection rule. The DP/DLP management unit 103 determines whether a DP or DLP is updated based on a setting of the update detection rule.

The update detection rule may be set by selecting any one of the "simple mode" and the "detail mode". The setting can be made through input operation on a dedicated screen (not shown) for setting the update detection rule, for example. The update detection rule for a DP and the update detection rule for a DLP may be set separately.

In the detection of a DP update, the DP/DLP management unit 103 detects an update of a DP when at least one of a source profile and a destination profile is updated.

In addition, when a DP (first device profile) is updated, the DP/DLP management unit 103 detects the DLP (DLP to be updated) created by using the updated DP (second device profile). When a DP is updated, the DLP including the updated DP in the link information part thereof as "the DP which is used to create the DLP" is a DLP which is created by using the DP before being updated. The DP/DLP management unit 103 detects the DLP which is created by using the DP before being updated.

The DP/DLP management unit 103 detects the DLP to be updated on the basis of the contents of the link information part of each DLP stored in the DLP management DB 142. The DLP which includes the identification information of the updated DP in the link information part thereof is detected as the DLP to be updated. For example, when the update of the source profile of "No. 1" shown in FIG. 3 is detected, the DLP of "DLP1B" (first device link profile) which is created by using the source profile of "No. 1" (second device profile) is detected as the DLP to be updated. In the similar manner, when the update of the destination profile of "No. b" is detected, the DLPs of "DLP1B" and "DLP2B" (first device link profile) which are created by using the destination profile of "No. b" (second device profile) are detected as the DLPs to be updated.

In certain cases, when a DLP is updated, the DLP update is accompanied by an update of the DP which is used to create the updated DLP. For example, in a certain case, when the DLP of "DLP1B" which is created by using the source profile of "No. 1" and the destination profile of "No. b" is updated, the source profile of "No. 1" or the destination profile of "No. b" is updated at the same time, which accompanies the update of the DLP of "DLP1B".

When a DLP is updated and at least any one of the DPs (first device profile) stored in the DP management DB 141 is updated by being replaced by the DP (second device profile) which is used to create the updated DLP, the DP/DLP management unit 103 detects the DP update.

In addition, the DP/DLP management unit 103 registers a newly-added DLP to the DLP management DE 142. In certain cases, the newly-added DLP is created by using the DP which has the same identification information as the DP which is already stored in the DP management IDE 141. Further, in certain cases, the update of the DP which is already stored in the DP management DB 141 is performed at the same time as the creation of the new DLP, which accompanies the creation of the new DLP. In other words, in certain cases, when the new DLP is registered in the DLP management DB 142, a DP update is performed at the same time.

When a registration of a newly-added DLP is performed and at least any one of the DPs (first device profile) stored in the DP management DB 141 is updated by being replaced by the DP (second device profile) which is used to create the newly-added DLP, the DP/DLP management unit 103 detects the DP update, in the same manner as the case where a DLP is updated.

A DP update which accompanies a DLP update or a DLP addition includes the case where either a source profile or a destination profile is updated, and the case where both a source profile and a destination profile are updated.

The DP/DLP calculating unit 104 creates a DP and a DLP. Creation of a DP and a DLP requires specific arithmetic processing (calculation), respectively. The arithmetic processing is performed by the CPU 11 which functions as the DP/DLP calculating unit 104.

Figure 4:
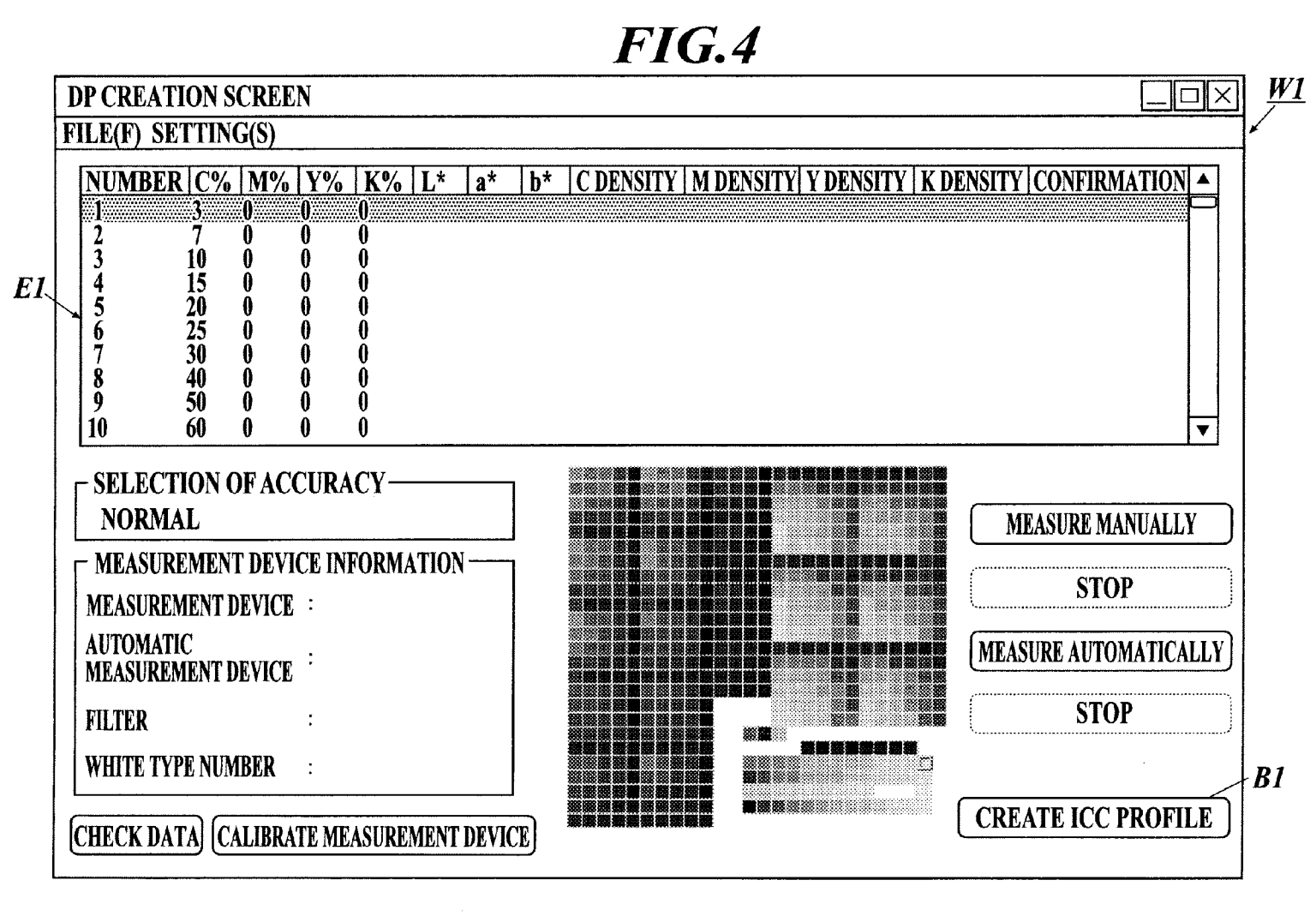

FIG. 4 shows an example of a DP creation screen W1. The DP creation screen W1 is one of the execution screens of the DP/DLP calculating unit 104 and is displayed on the display unit 16.

On the DP creation screen W1 shown in FIG. 4, when an "ICC profile creation" button B1 is touched, the DP according to the contents displayed on a measurement result display unit E1 is created. When the created DP is to be used to update any one of the DPs which are already stored in the DP management DB 141, the DP to be updated is replaced by the DP after being created, and is updated.

The touch on the "ICC profile creation" button B1 may be made a trigger for a check of a DP update to be performed by the DP/DLP management unit 103.

In creating a DP, the measurement result data obtained by measuring a chart to be measured (not shown), on the basis of which a DP is created, with a dedicated measurement device (not shown) is first inputted. The contents of the inputted measurement result data is displayed on the measurement result display unit E1. As for the measurement result data, the measurement result data which is already created may be transferred to the controller 10, or alternatively, the chart to be measured may be measured with the measurement device connected to the controller 10 and the measurement result may be imported from the measurement device into the controller 10.

The chart to be measured for a source profile and that for a destination profile may be the same or may be different from each other. If the chart to be measured for a source profile and that for a destination profile is different from each other, the chart to be measured for creating a source profile is created based on printed material which is the original of the source profile, and the chart to be measured for creating a destination profile is created based on an output device (such as the MFP 3).

Figure 5:
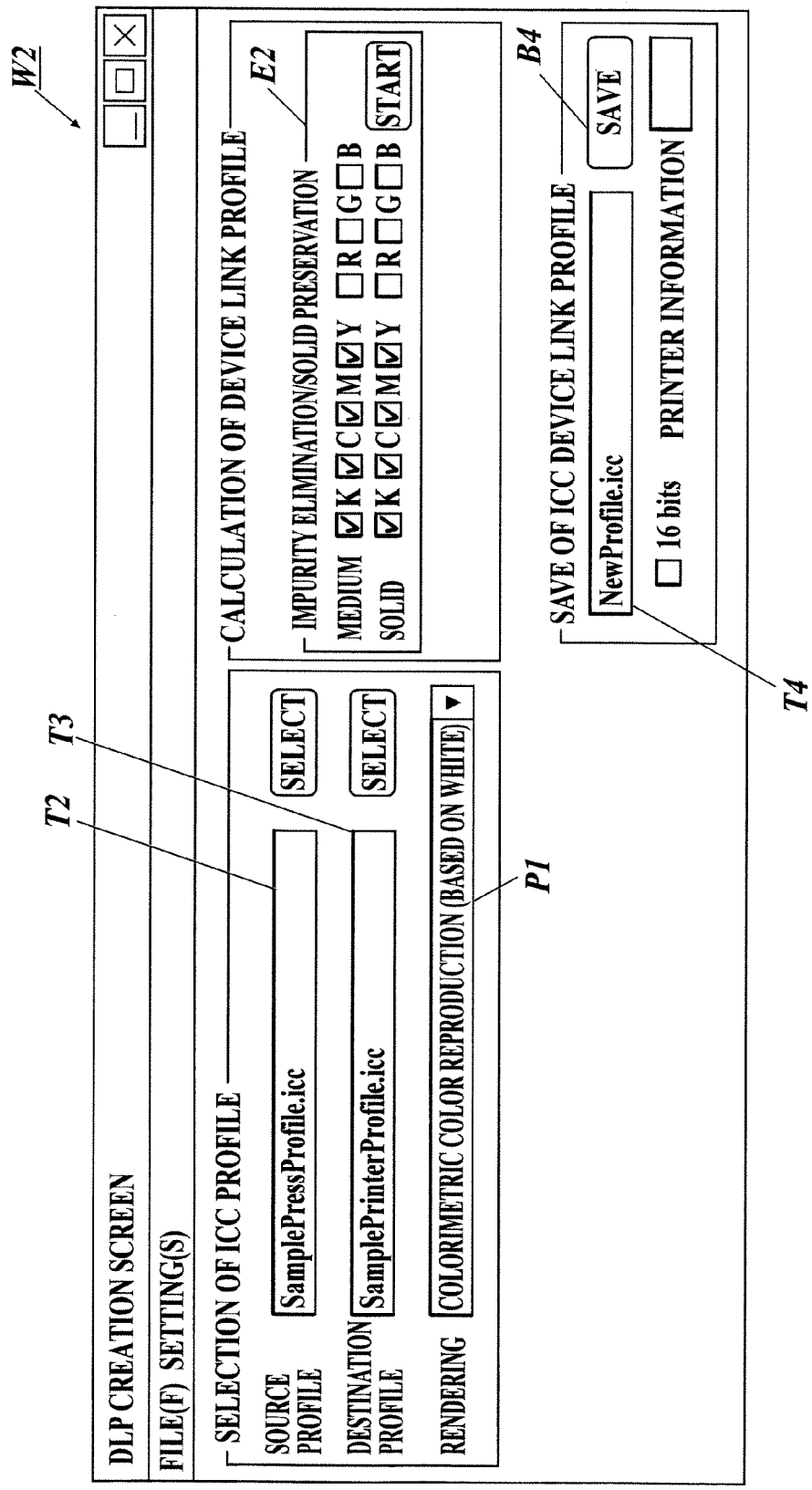
FIG. 5 is an explanatory view illustrating an example of a DLP creation screen.

FIG. 5 shows an example of a DLP creation screen W2. The DLP creation screen W2 is one of the execution screens of the DP/DLP calculating unit 104 and is displayed on the display unit 16.

In creating a DLP, the DPs to be used to create the DLP are specified.

In the present embodiment, the specification of a source profile is performed by inputting the file name of the source profile to be used for DLP creation into a source profile name input text box T2. In the similar manner, the specification of a destination profile is performed by inputting the file name of the destination profile to be used for DLP creation into a destination profile name input text box T3.

In creating a DLP, a user can make a setting for attribute information of the DLP to be created. The attribute information is the information of various conditions when performing color conversion by using a DLP. The contents of the set attribute information are reflected in the created DLP. For each DLP stored in the DLP management DB 142, attribute information is set individually.

In the present embodiment, a method for converting color space (rendering intent) in color conversion can be specified, by making a setting for the attribute information. In the case of the DLP creation screen W2 shown in FIG. 5, the rendering intent can be specified by the input operation to a pull-down menu P1.

In addition, in the present embodiment, whether impurity elimination and solid preservation is performed or not in color conversion can be specified by making a setting for the attribute information. In the case of the DLP creation screen W2 shown in FIG. 5, whether impurity elimination and solid preservation is performed or not can be specified by an input operation to a check box display area E2.

In addition, in creating a DLP, the file name of a DLP is inputted. In the present embodiment, the file name of a DLP is inputted into a DLP name input text box T4.

When a "save" button B4 is touched with DP specification, attribute information setting, and input of a DLP file name being performed, a DLP is created. When a created DLP is a DLP to be used to update any of the DLPs which are already stored in the DLP management DB 142, the DLP to be updated is replaced by the created DLP, and is updated. In addition, when the DP which is used for the created DLP is a DP to be used to update any of the DPs which are already stored in the DP management DB 141, the DP to be updated is replaced by the DP which is used for the created DLP, and is updated.

The touch on the "save" button 34 may be made a trigger for a check of a DLP update to be performed by the DP/DLP management unit 103.

In addition, when the DP/DLP management unit 103 detects a DP update, the DP/DLP calculating unit 104 re-creates the DLP to be updated.

In re-creating a DLP, the DP/DLP calculating unit 104 automatically re-creates the DLP to be updated detected by the DP/DLP management unit 103 by using the updated DP. Then, the DP/DLP calculating unit 104 updates the DLP by replacing the DLP to be updated by the automatically-re-created DLP by using the updated DP.

When there are a plurality of DLPs to be updated, the re-creation is performed for each of the plurality of the DLPs to be updated.

When only one of the source profile and the destination profile between the DPs to be used to re-create a DLP is updated, the DP/DLP calculating unit 104 re-creates the DLP by using one of the DPs which is updated and the other of the DPs which is not updated. When both the source profile and the destination profile of the DPs to be used to re-create a DLP is updated, the DP/DLP calculating unit 104 re-creates the DLP by using both of the updated DPs.

Before the re-creation of a DLP which is to be performed when a DP update is detected, the DP/DLP calculating unit 104 performs processing for asking a user whether to perform the DLP re-creation automatically or not and whether to perform the DLP re-creation immediately or not. In the present embodiment, the DP/DLP calculating unit 104 allows the display unit 16 to display a confirmation dialog W3.

FIG. 6 shows an example of the confirmation dialog W3.

The confirmation dialog W3 shown in FIG. 6 includes a "YES" button B11, a "NO" button B12, and a "LATER" button B13.

The "YES" button B11 is the button to receive an input of a user who intends to re-create a DLP immediately and automatically.

When the "YES" button B11 is touched, the re-creation of a DLP is preformed immediately and automatically.

When the re-creation of a DLP is completed and the DLP to be updated is updated by being replaced by the DLP after being re-created, the DP/DLP calculating unit 104 performs processing for notifying that the DLP update is completed. In the present embodiment, the DP/DLP calculating unit 104 allows the display unit 16 to display an update completion message W4.

FIG. 7 shows an example of the update completion message W4.

As shown in FIG. 7, the update completion message W4 includes a text notifying that the DLP update is completed.

The "NO" button B12 is a button to receive an input of a user who intends not to re-create a DLP automatically.

When the "NO" button B12 is touched, re-creation of a DLP is not performed. In this case, the DLP to be updated is not updated automatically.

In the confirmation dialog W3, when a user intends to update the DLP to be updated after touching the "NO" button B12, the user needs to update the DLP manually. In the manual DLP update, a user first performs DLP creation processing by using the DLP creation screen W2 shown in FIG. 5, by using an updated DP. Then, the user updates the DLP to be updated stored in the DLP management DB 142 by replacing the DLP to be updated with the DLP which is created by using the updated DP.

The "LATER" button B13 is a button to receive an input of a user who intends not to re-create a DLP immediately.

When the "LATER" button B13 is touched, the DP/DLP calculating unit 104 sets a timer to manage a predetermined passage of time. Then, when the time is up and predetermined passage of time is detected with the timer, the DP/DLP calculating unit 104 allows the display unit 16 to display the confirmation dialog W3 again. That is, when the "LATER" button B13 is touched, the DP/DLP calculating unit 104 reconfirms a the user's intention regarding a DLP re-creation by displaying the confirmation dialog W3 again after the predetermined period of time has passed.

In addition, a DP update and a DLP update or a DLP addition may not necessarily be performed by the DP/DLP calculating unit 104. For example, a DP which is already created to be used for an update may be transferred from an external device to the controller 10 and may be registered in the DP management DB 141. In this case, a plurality of DPs to be used for updates may be transferred from the external device and registered at a time. The same applies to a DLP update or a DLP addition, and a DP update accompanying the DLP update or the DLP addition.

Whether a DP update and a DLP update or a DLP addition are performed by the DP/DLP calculating unit 104 or not, the DP/DLP management unit 103 detects a DLP to be updated when a DP update is performed. Then, the DP/DLP calculating unit 104 re-creates a DLP.

When re-creating a DLP automatically, the attribute information which is set for the DLP to be updated is used for the attribute information of the DLP to be re-created.

A semi-automatic mode may be provided where the attribute information of the DLP to be re-created is set manually when re-creating a DLP automatically. In the semi-automatic mode, the DLP creation screen W2 is displayed after the "YES" button B11" is touched in the confirmation dialog W3. Then, in the DLP creation screen W2, a user can make a setting for the attribute information. The attribute information which is first displayed on the DLP creation screen W2 may be set as the attribute information which is preliminarily set for the DLP to be updated. After the setting for the attribute information is completed on the DLP creation screen W2, the DP/DLP calculating unit 104 re-creates a DLP. The DP/DLP calculating unit 104 creates a DLP reflecting the attribute information which is set on the DLP creation screen W2, instead of the attribute information which is set for the DLP to be updated.

In re-creating a DLP, there may be an option about whether to automatically use the attribute information which is set for the DLP to be updated, or to set manually the attribute information before re-creating a DLP in the semi-automatic mode. This selection may be carried out through an input operation into a dedicated setting screen (not shown) related to the semi-automatic mode, for example.

In the following, the flow of each processing performed by the controller 10 is described by using the flow charts from FIG. 8 to FIG. 12.

Figure 8:
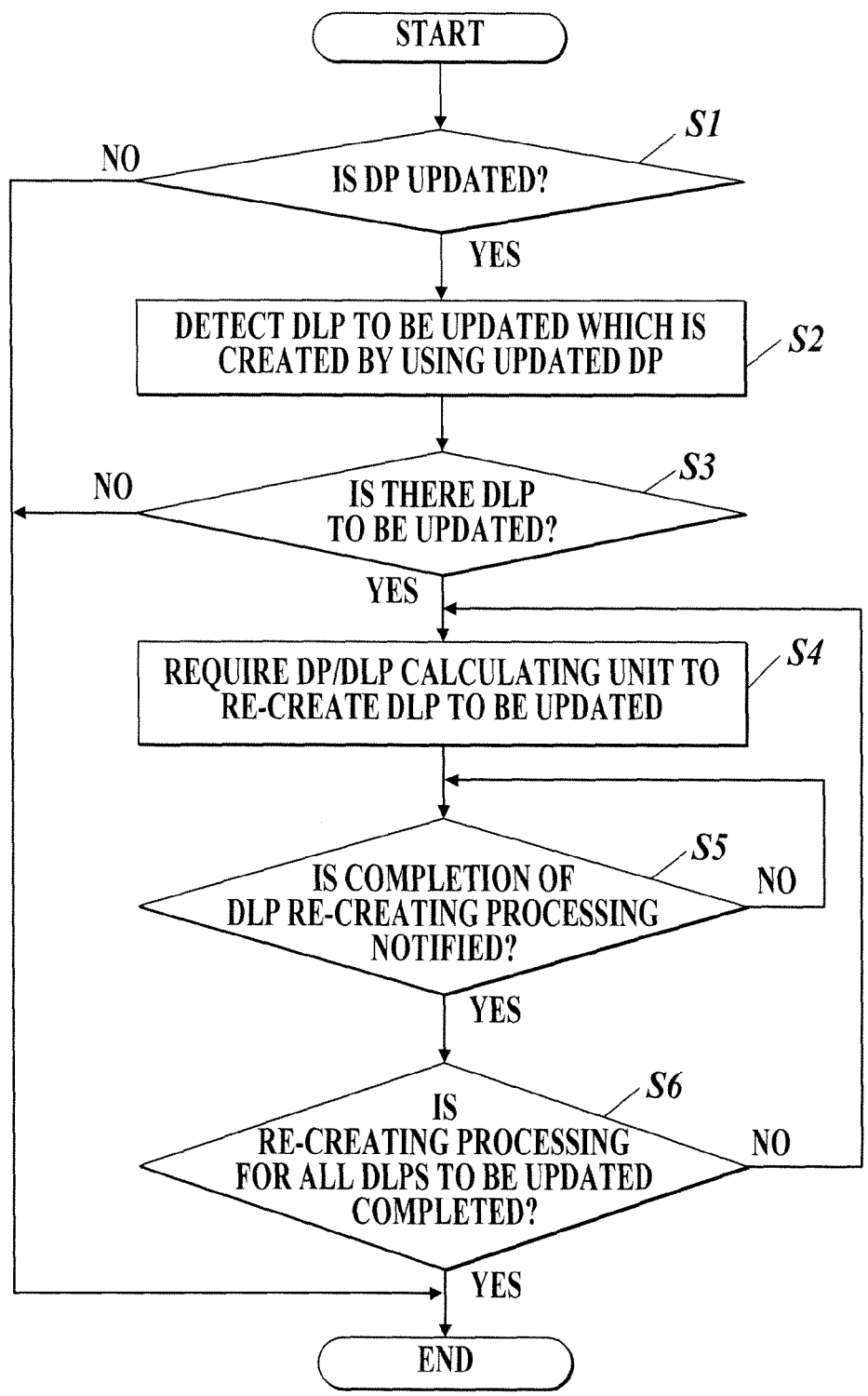
FIG. 8 is a flow chart illustrating the flow of the processing from a DP update to DLP re-creating processing.

FIG. 8 shows the flow of the processing from a DP update to DLP re-creating processing.

First, the DP/DLP management unit 103 determines whether or not there is an updated DP (second device profile) stored in the DP management DB 141 (Step S1). When there is an updated DP (Step S1: YES), the DP/DLP management unit 103 detects a DLP (first device link profile) to be updated based on the contents of the link information part of each DLP (Step S2). When the DLP to be updated is detected in the processing at Step S2 (Step S3: YES), the DP/DLP management unit 103 requires the DP/DLP calculating unit 104 to re-create the DLP (second device link profile) for the DLP to be updated (Step S4). After that, the processing is on standby until the DP/DLP calculating unit 104 notifies the completion of the DLP re-creating processing (Step S5: NO). When the DP/DLP calculating unit 104 notifies the completion of the DLP re-creating processing after the processing at Step S4 (Step S5: YES), the DP/DLP management unit 103 determines whether or not the re-creating processing for all the DLPs to be updated which are detected at Step S2 is completed (Step S6). When the re-creating processing for all the DLPs to be updated is not completed (Step S6: NO), the processing goes back to Step S4, and the DP/DLP management unit 103 allows the DP/DLP calculating unit 104 to perform re-creation of a DLP for the DLP to be updated for which the DLP re-creating processing is not completed. In the determination at Step S6, when the re-creating processing for all the DLPs to be updated is completed (Step S6: YES), the DP/DLP management unit 103 finishes the processing.

When there is no updated DP stored in the DP management DB 141 (Step S1: NO) in the determination at Step S1, or when a DLP to be updated is not detected in the determination at Step S3 (Step S3: NO), the DP/DLP management unit 103 finishes the processing.

Figure 9:
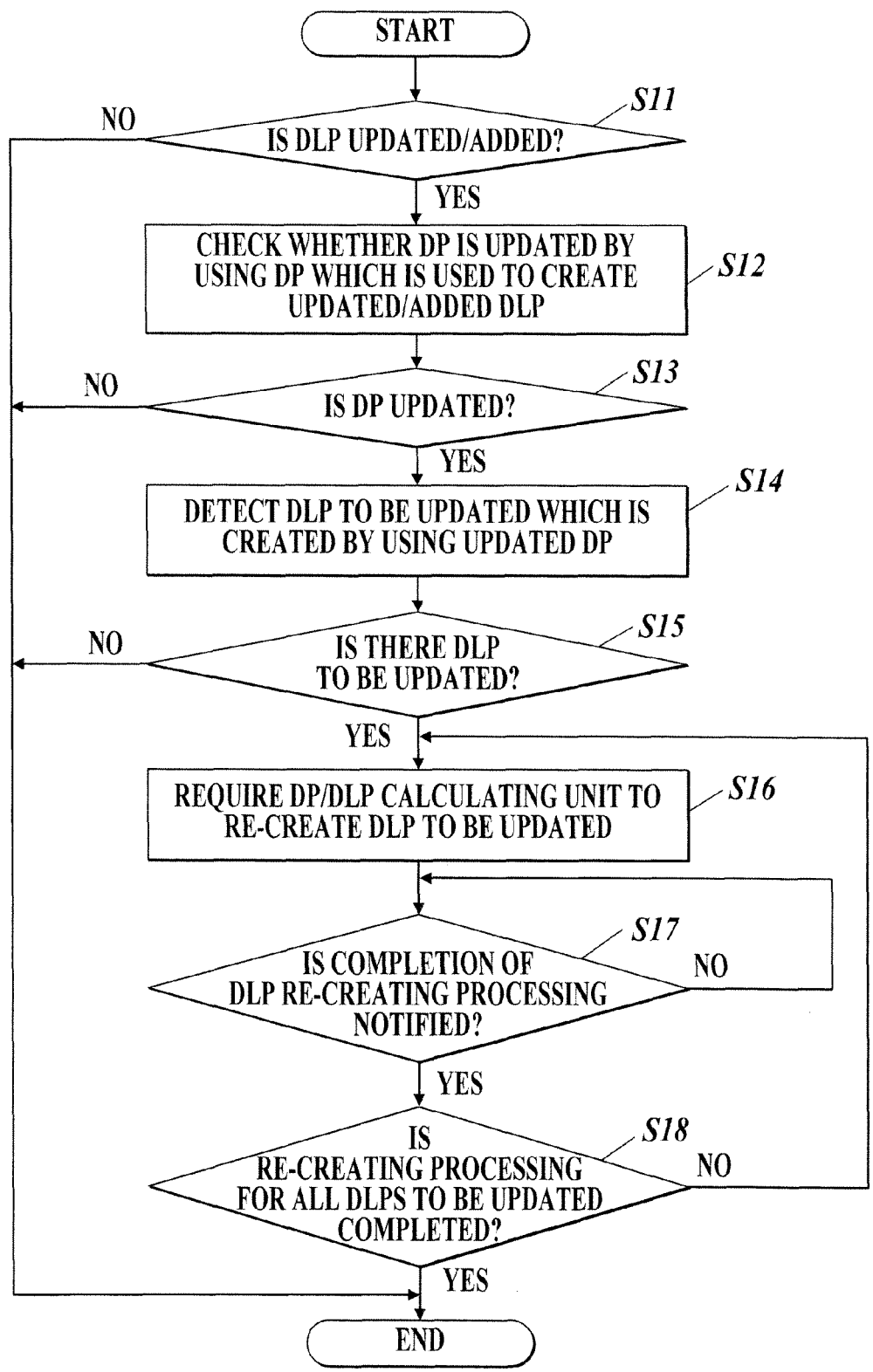
FIG. 9 is a flow chart illustrating the flow of the processing from a DLP update or a DLP addition to the DLP re-creating processing.

FIG. 9 shows a flow of the processing from a DLP update or a DLP addition to the DLP re-creating processing.

First, the DP/DLP management unit 103 determines whether there is an updated DLP or added DLP stored in the DLP management DB 142 (Step S11). At Step S11, the detecting processing for an updated DLP and the detecting processing for an added DLP are in no particular order. When there is an updated DLP or an added DLP (Step S11: YES), the DP/DLP management unit 103 checks whether or not the DP (second device profile) which is used to create the updated or added DLP replaces the DP (first device profile) stored in the DP management DB 141, which accompanies the DLP update or the DLP addition (Step S12). When the DP is updated as the result of the check processing at Step S12 (Step S13: YES), the DP/DLP management unit 103 detects the DLP (first device link profile) to be updated based on the contents of the link information part of each DLP (Step S14). When the DLP to be updated is detected in the processing at Step S14 (Step S15: YES), the DP/DLP management unit 103 makes a request to allow the DP/DLP calculating unit 104 to re-create the DLP (second device link profile) in place of the DLP to be updated (Step S16). After that, the processing is on standby until the DP/DLP calculating unit 104 notifies the completion of the DLP re-creating processing (Step S17: NO).

When the DP/DLP calculating unit 104 notifies the completion of the DLP re-creating processing after the processing at Step S16 (Step S17: YES), the DP/DLP management unit 103 determines whether or not the re-creating processing for all the DLPs to be updated which are detected at Step S14 is completed (Step S18). When the re-creating processing for all the DLPs to be updated is not completed (Step S18: NO), the processing goes back to Step S16, and the DP/DLP management unit 103 allows the DP/DLP calculating unit 104 to perform re-creation of a DLP for the DLP to be updated for which the DLP re-creating processing is not completed. In the determination at Step S18, when the re-creating processing for all the DLPs to be updated is completed (Step S18: YES), the DP/DLP management unit 103 finishes the processing.

When there is not an updated DLP or an added DLP (Step S11: NO) in the determination at Step S11, the DP/DLP management unit 103 finishes the processing. When there is no updated DP stored in the DP management DB 141 (Step S13: NO) in the determination at Step S13, or when a DLP to be updated is not detected in the determination at Step S15 (Step S15: NO), the DP/DLP management unit 103 finishes the processing.

Figure 10:
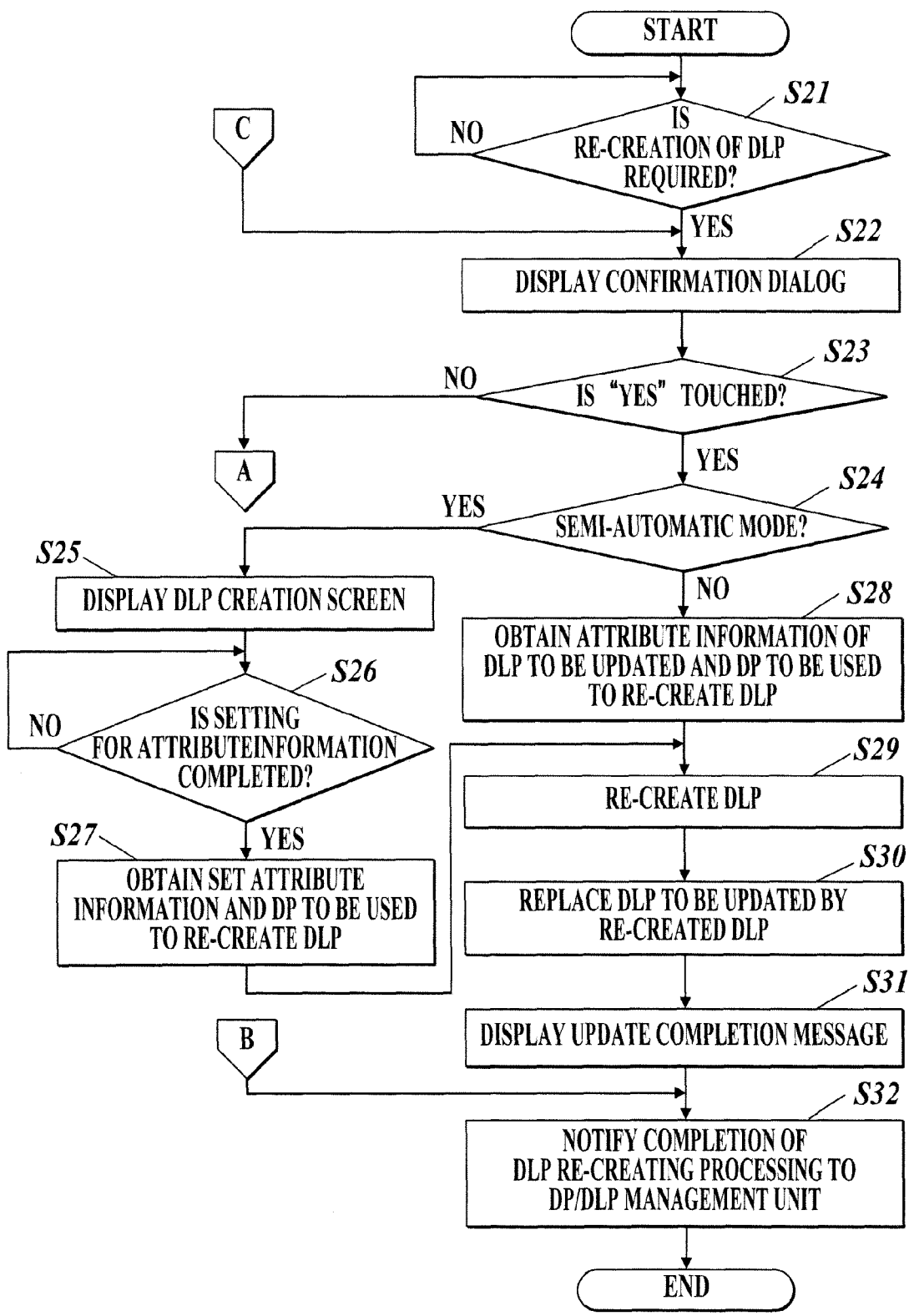
FIG. 10 is a flow chart illustrating the flow of the processing from Step S21 to Step S32 in the DLP re-creating processing.
Figure 11:
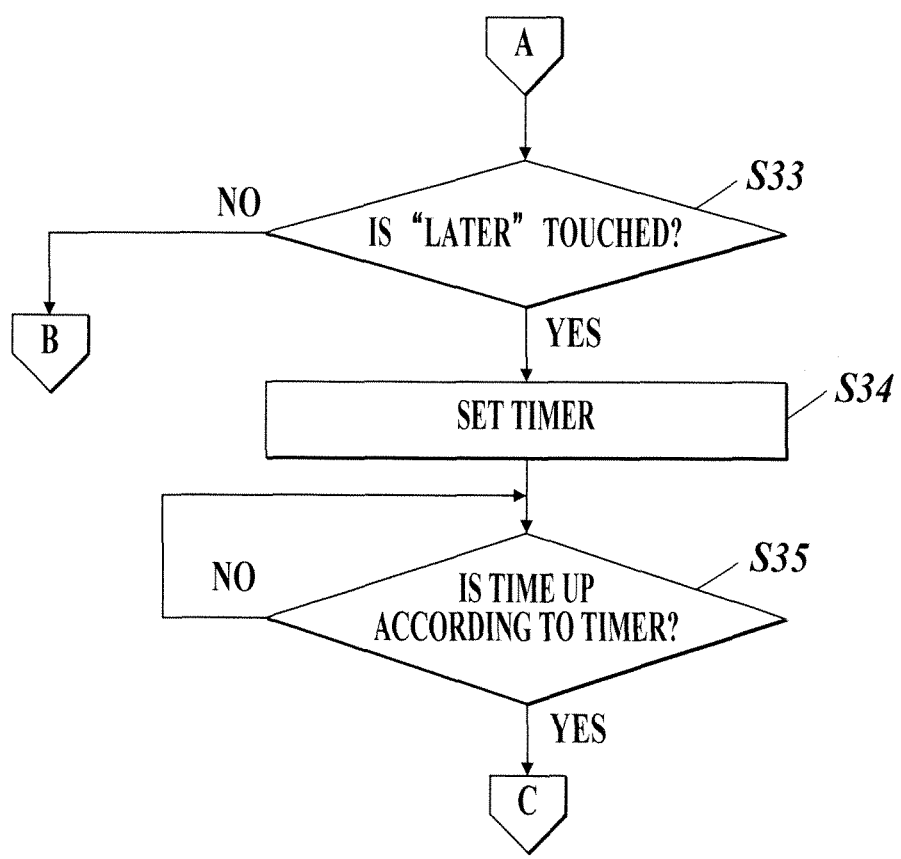
FIG. 11 is a flow chart illustrating the flow of the processing from Step S33 to Step S35 in the DLP re-creating processing.

FIGS. 10 and 11 show the flow of the DLP re-creating processing.

FIG. 10 is a flow chart illustrating the flow of the processing from Step S21 to Step S32 in the DLP re-creating processing, and FIG. 11 is a flow chart illustrating the flow of the processing from Step S33 to Step S35 in the DLP re-creating processing;

When receiving a request to re-create a DLP from the DP/DLP management unit 103 (Step S21: YES), the DP/DLP calculating unit 104 allows the confirmation dialog W3 to be displayed (Step S22). When the "YES" button 311 is touched on the confirmation dialog W3 (Step S23: YES), the DP/DLP calculating unit 104 checks whether or not the semi-automatic mode is selected in a mode setting (Step S24).

When the semi-automatic mode is selected in the mode setting (Step S24: YES), the DP/DLP calculating unit 104 allows the DLP creation screen W2 to be displayed (Step S25). When the setting for the attribute information of a DLP is completed by a user (Step S26: YES) on the DLP creation screen W2, the DP/DLP calculating unit 104 obtains the attribute information which is set at Step S26, and obtains the DP to be used for re-creation of the DLP including the updated DP from the DP management DB 141 of the storage unit 14 (Step S27).

On the other hand, when the semi-automatic mode is not selected in the mode setting (Step S24: NO), the DP/DLP calculating unit 104 obtains the DP and the DLP required to re-create the DLP from the DP management DB 141 and the DLP management DB 142, respectively, of the storage unit 14 (Step S28). In the processing at Step S28, the DP/DLP calculating unit 104 obtains the DP to be used for re-creation of the DLP which includes the updated DP, and obtains the attribute information which is set for the DLP to be updated.

After the processing at Step S27 or Step S28, the DP/DLP calculating unit 104 creates the DLP by using the updated DP (Step S29). In the processing at Step S29, the DP/DLP calculating unit 104 creates both the actual data part and the link information part of the DLP, and makes both the parts into file data of one DLP. Then, the DP/DLP calculating unit 104 replaces the DLP to be updated by the DLP created at Step S29 (Step S30). After the processing at Step S30, the DP/DLP calculating unit 104 allows the update completion message W4 to be displayed (Step S31). Then, the DP/DLP calculating unit 104 notifies the completion of the DLP re-creating processing to the DP/DLP management unit 103 (Step S32), and finishes the processing.

When the "YES" button B11 is not touched (Step S23: NO) and the "LATER" button B13 is touched (Step S33: YES) in the confirmation dialog W3, The DP/DLP calculating unit 104 sets a timer to manage a predetermined passage of time (Step S34). After that, when the time is up and the predetermined passage of time is detected with the timer (Step S35: YES), the processing goes back to Step S22, and the DP/DLP calculating unit 104 allows the confirmation dialog W3 to be displayed. When the "YES" button B11 is not touched (Step S23: NO) and the "LATER" button B13 is not touched (Step S33: NO), that is, when the "NO" button B12 is touched in the confirmation dialog W3, the DP/DLP calculating unit 104 performs the processing at Step S32, and then, finishes the processing.

Figure 12:
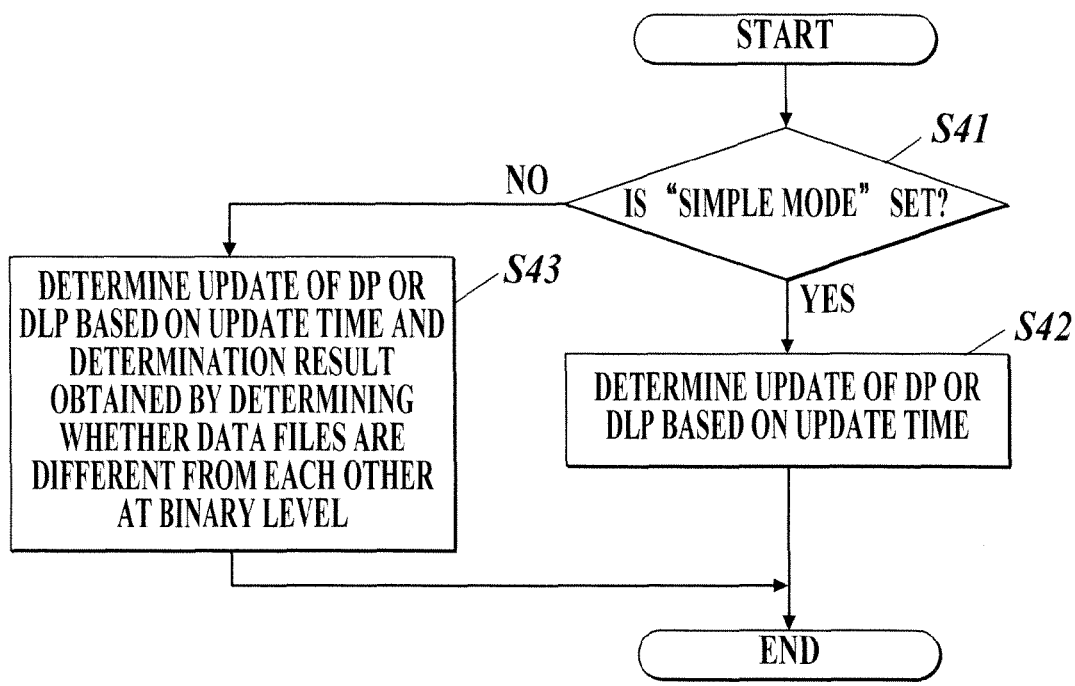
FIG. 12 is a flow chart illustrating the flow of the processing for setting an update detection rule.

FIG. 12 shows the flow of the processing for setting an update detection rule. When the "simple mode" is selected in the mode setting (Step S41), the DP/DLP management unit 103 determines the existence of an update of a DP or DLP based on only creation time information (update time) of each data file (Step S42). When the "simple mode" is not selected (Step S41: NO), that is, when the "detail mode" is selected in the mode setting, the DP/DLP management unit 103 determines the existence of an update of a DP or DLP based on creation time information (update time) of each data file and based on the determination result obtained by determining whether data files are different from each other at a binary level (Step S43).

The mode selection result obtained in the mode selection processing for checking an update of a DP or DLP is reflected in the determination of a DP update or a DLP update to be performed after the selection.

As described above, according to the present embodiment, when a DP is updated, the DP/DLP management unit 103 detects the update. In addition, the DP/DLP management unit 103 detects the DLP to be updated among the DLPs stored in the DLP management DB 142. Then, the DP/DLP calculating unit 104 creates a DLP automatically by using the updated DP, and replaces the DLP to be updated by the created DLP.

Thus, the update of the DLP which needs to be updated because of a DP update can be automatically performed.

Therefore, it is not necessary for a user to manually confirm the contents of the DLP registered in the controller, and to manually check whether the updated DP is used for each DLP. Further, it is also not necessary for a user to manually create the updated DLP by using the updated DP. Still further, it is also not necessary for a user to manually replace the DLP before being updated with the updated DLP which is created. Thus, it is not necessary for a user to manually perform the operations accompanying a DLP update. Consequently, a burden on a user accompanying a DLP update can be reduced to a great extent.

In addition, when a DLP is updated or a new DLP is added, the DP/DLP management unit 103 detects the updated or added DLP. Further, when the DP stored in the DP management DB 141 is replaced by the DP which is used to create the detected DLP, the DP/DLP management unit 103 detects the updated DP. Still further, the DP/DLP management unit 103 detects the DLP to be updated among the DLPs stored in the DLP management DB 142. Then, the DP/DLP calculating unit 104 creates a DLP automatically by using the updated DP, and replaces the DLP to be updated by the created DLP.

In this way, when a DP is updated with a DLP update, the DLP which needs to be updated because of the DP update can also automatically be updated. Therefore, it is not necessary for a user to manually check whether or not the DP used for the updated DLP is to update a DP registered in the controller when a DLP is updated. In addition, when a DP is updated, it is not necessary for a user to manually confirm the contents of the DLP registered in the controller, and to manually check whether the updated DP is used for each DLP. Further, it is also not necessary for a user to manually create the updated DLP by using the updated DP. Still further, it is also not necessary for a user to manually replace the DLP before being updated with the updated DLP which is created. Thus, it is not necessary for a user to manually perform the operations accompanying a DLP update. Consequently, a burden on a user accompanying a DLP update can be reduced to a great extent.

Moreover, the controller 10 of the present embodiment enables a mode setting, that is, enables the selection of one of the "simple mode" and the "detail mode".

In this way, a user can set an update detection rule for DPs or DLPs at his or her discretion.

Further, each DP and each DLP have creation time information (update date and time) of each DP and each DLP, respectively. In the update detection rule in the "simple mode", the DP/DLP management unit 103 can detect a DP or DLP, the update date and time of which is updated, as the updated DP or DLP.

In this way, the update detection rule for a DP or DLP can be clearly set.

In addition, the processing for detecting an update of a DP or DLP based on only creation time information involves a slight burden. Therefore, the processing for detecting an update of a DP or DLP can be performed speedily without imposing much burden on the CPU 11.

Further, in the update detection rule in the "detail mode", the DP/DLP management unit 103 can detect the following DP or DLP as an updated DP or DLP; that is, the DP or DLP, the update date and time of which is changed, and which is changed at a binary level after the change of the update date and time.

In this way, the update detection rule for a DP or DLP can be clearly set.

In addition, since update of a DP or DLP is determined at a binary level, the change of a DP or DLP, for which only the creation time information is changed and for which the contents of the data is not changed, is not judged to be the DP or DLP to be updated. Therefore, the DLP re-creating processing which is caused by the change of a DP or DLP, for which only the creation time information is changed and for which the contents of the data is not changed, can be prevented from being performed. In other words, a processing burden caused by unnecessary DLP re-creating processing can be prevented from being imposed.

Moreover, a DP includes a source profile and a destination profile.

When at least any one of a source profile and a destination profile is updated, the DP/DLP management unit 103 detects the update. In addition, the DP/DLP management unit 103 detects the DLP which is created by using at least any one of an updated source profile and an updated destination profile.

In this way, a DLP can be re-created when any of a source profile and a destination profile is updated, and DLP update accompanying the update of the source profile and/or the destination profile can be performed automatically.

Further, attribute information is set for each DLP, and the DP/DLP calculating unit 104 can automatically create a DLP by using the attribute information which is set for the DLP to be updated.

This makes it possible to automatically allow the attribute information, which is set for the DLP before being updated, to be still valid for the DLP after being updated.

In addition, various conditions in the case of performing color conversion by using a DLP can be set individually for each DLP by using attribute information.

In addition, when the mode is set to the semi-automatic mode, the setting for attribute information can be made on the DLP creation screen W2 before re-creating a DLP. The DP/DLP calculating unit 104 can automatically create a DLP by using the attribute information which is set on the DLP creation screen W2, instead of the attribute information which is set for the DLP to be updated.

In this way, when a user desires to change a setting for attribute information with DLP re-creation, the attribute information can easily be changed.

Further, after re-creation of a DLP is completed, the DP/DLP calculating unit 104 notifies the DLP update completion through the update completion message W4.

In this way, a user can easily know that a DLP update accompanying a DP update is automatically completed.

Further, before a DLP is re-created, the DP/DLP calculating unit 104 allows the confirmation dialog W3 to be displayed as the processing for asking a user whether to re-create a DLP automatically or not. When the "NO" button B12 is touched in the confirmation dialog W3, the DP/DLP calculating unit 104 does not perform re-creation of a DLP.

In this way, when a user does not desire an automatic update of a DLP, the automatic update of the DLP can be prevented from being performed. That is, the DLP which is already registered in the DLP management DB 142 can be maintained.

When there is a reason which keeps a user from desiring to automatically update a DLP, when, for example, a user desires to maintain the DLP which is already registered in the DLP management DB 142, the DLP before being updated is prevented from being automatically rewritten by an automatic update of the DLP, and the DLP before being updated can be maintained.

further, before re-creating a DLP, the DP/DLP calculating unit 104 allows the confirmation dialog W3 to be displayed as the processing for asking a user whether to re-create a DLP immediately or not. Then, in the confirmation dialog W3, when the "LATER" button B13 is touched, the DP/DLP calculating unit 104 sets the timer to manage a predetermined passage of time, and counts the passage of time until the predetermined time has passed. When the time is up and the predetermined passage of time is detected with the timer, the DP/DLP calculating unit 104 allows the display unit 16 to display the confirmation dialog W3 again.

In this way, a user can put off making a decision about whether to automatically update a DLP. Then, the user can make any response in the confirmation dialog W3 redisplayed after the predetermined passage of time.

In addition, when a user does not desire to automatically update a DLP immediately, the execution of the automatic update of the DLP can be put off. In other words, it is possible to maintain the DLP, which is already registered in the DLP management DB 142, as it is, until the predetermined period of time has passed. For example, when the confirmation dialog W3 related to the update of the DLP used for the job which is being printed, and when updating the DLP immediately, the DLP is updated in the middle of the execution of the job. In this case, the color reproduction may change after the DLP update in the printing in the same job. However, in some cases, a user may not desire such a change of the color reproduction. In such a case, the user can select to maintain the DLP which is presently used and complete the print job with the same color reproduction by putting off the execution of the automatic update of the DLP.

Further, a user can automatically update the DLP by selecting "YES" in the confirmation dialog W3 redisplayed after a predetermined passage of time. Therefore, the time and effort to manually update the DLP can be saved.

In addition, the embodiment of the present invention disclosed above should not be considered restrictive but should be considered an example, in every respect. The scope of the present invention is not shown by the abovementioned description but is shown by the claims, and the present invention is intended to include the equivalent of what is claimed and all the variations within the scope of claims.

For example, the function of the DP/DLP calculating unit 104 may be included in the client PC 2.

Figure 13:
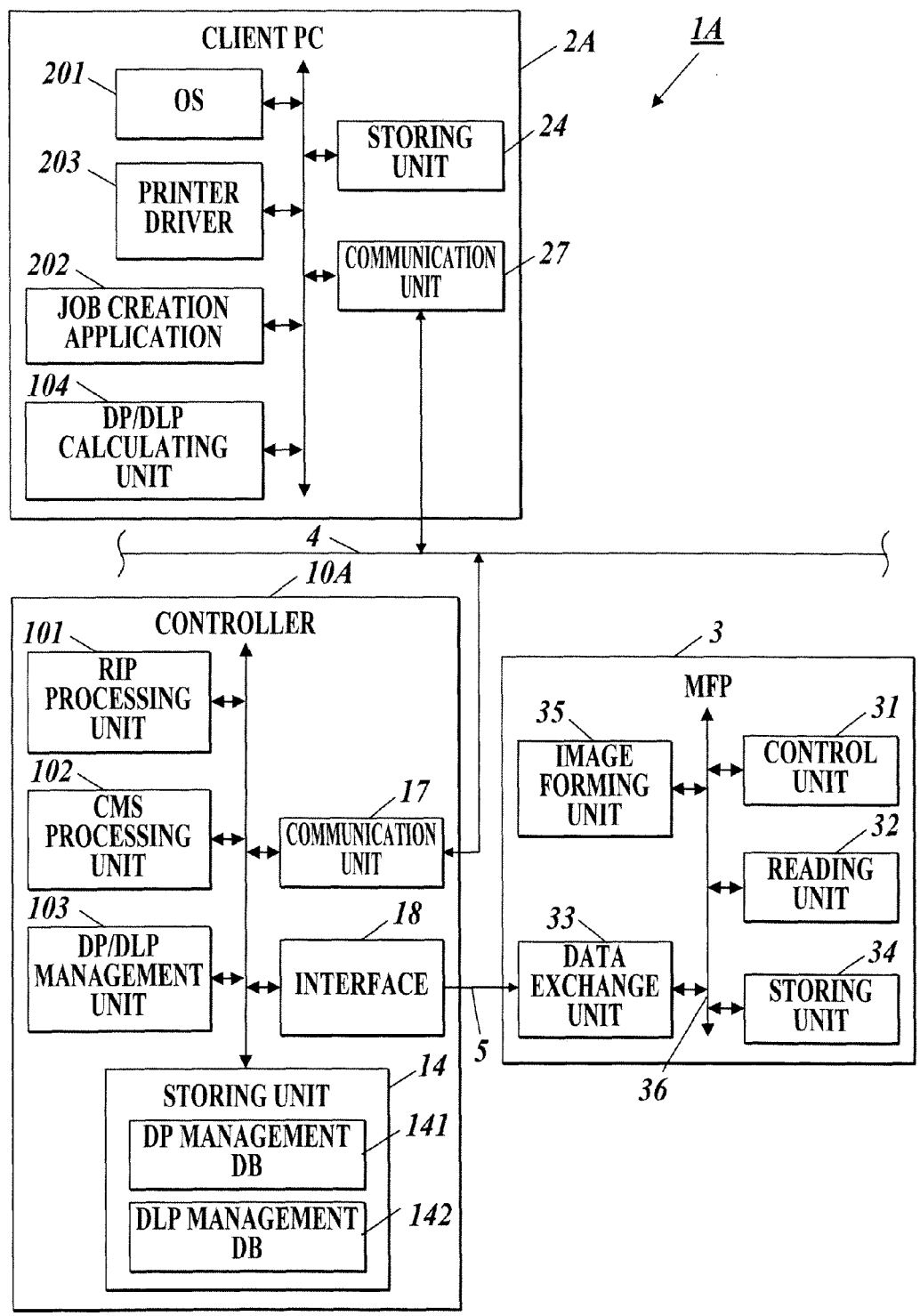
FIG. 13 is a function block diagram illustrating a configuration of a CMS where a client PC has a function of a DP/DLP calculating unit.

FIG. 13 shows the configuration of the CMS 1A where the client PC 2A includes the function of the DP/DLP calculating unit 104.

In the CMS 1A, when re-creating a DLP, the DP/DLP management unit 103 of the controller 10A performs the processing for transmitting information for re-creating the DLP to the client PC 2A. The information for re-creating the DLP means the data of the DP used to create the DLP to be updated, attribute information of the DLP to be updated, and other various types of information which is necessary for re-creating the DLP. The DP/DLP calculating unit 104 of the client PC 2A re-creates a DLP by using the received information for re-creating the DLP. The DP/DLP calculating unit 104 of the client PC 2A performs the processing for transmitting the created DLP to the controller 10A. The controller 10A replaces the DLP to be updated by the received DLP and updates the DLP.

The recreation of a DLP by using the semi-automatic mode, the processing for confirming a user's intention about whether to perform automatic re-creation of a DLP or whether to perform the automatic re-creation of the DLP immediately on the confirmation dialog W3, or the like, may be performed by the DP/DLP calculating unit 104 of the client PC 2A.

A system where a DP included in the link information part of a DLP cannot be deleted from the DP management DB 141 may be adopted.

Although the foregoing description discloses an example where a ROM is used as a computer-readable medium for the programs according to the present invention, the medium is not limited to the example. As another computer-readable medium, a nonvolatile memory such as a flash memory and a portable storage medium such as a CD-ROM may be applied.

Further, a carrier wave may be applied to the present invention as the medium to provide the program data according to the present invention via a communication line.

According to one aspect of the preferred embodiments of the present invention, a device link profile creation method includes: storing a plurality of device link profiles in a storage unit with information about a first device profile which is used to create one of the plurality of device link profiles, for each of the plurality of device link profiles; storing the first device profile in the storage unit; and performing control by a control unit to: when the first device profile is updated to be a second device profile, detect the second device profile; detect a first device link profile among the plurality of device link profiles, the first device link profile being created by using the first device profile, as a device link profile to be updated; automatically create a second device link profile, by using the second device profile; and update the detected device link profile to be updated by replacing the device link profile to be updated with the created second device link profile.

According to another aspect of the preferred embodiments of the present invention, a device link profile creation method includes: storing a plurality of device link profiles in a storage unit with information about a first device profile which is used to create one of the plurality of device link profiles, for each of the plurality of device link profiles; storing the first device profile in the storage unit; and performing control by a control unit to: when at least any one of the plurality of device link profiles is updated, detect the updated device link profile; when a device link profile is newly added, detect the newly-added device link profile; when the first device profile stored in the storage unit is updated to be a second device profile which is used to create the updated or the newly-added device link profile, detect the second device profile; detect a first device link profile among the plurality of device link profiles, the first device link profile being created by using the first device profile, as a device link profile to be updated; automatically create a second device link profile by using the second device profile; and update the detected device link profile to be updated by replacing the device link profile to be updated with the created second device link profile.

Preferably, the device link profile creation method further includes setting an update detection rule for a device link profile by allowing a choice, by the control unit, of whether to detect a device link profile, creation time information of which is changed, as the updated device link profile, or to detect a device link profile, the creation time information of which is changed, and which includes a change at a binary level after the creation time information is changed, as the updated device link profile, wherein the control unit detects an update of the updated device link profile by using the update detection rule for a device link profile.

Preferably, the device link profile creation method further includes setting an update detection rule for a device profile by allowing a choice, by the control unit, of whether to detect a device profile, creation time information of which is changed, as the second device profile, or to detect a device profile, the creation time information of which is changed, and which includes a change at a binary level after the creation time information is changed, as the second device profile, wherein the control unit detects an update of the first device profile into the second device profile by using the update detection rule for a device profile.

Preferably, the first device profile includes a source profile and a destination profile; and when at least any one of the source profile and the destination profile is updated, the control unit detects an update of the source profile and/or the destination profile, and the control unit detects the first device link profile among the plurality of device link profiles, the first device link profile being created by using the updated source profile and/or the updated destination profile, as the device link profile to be updated.

Preferably, each of the plurality of device link profiles has attribute information which is individually set; and the control unit sets the attribute information, which is set for the first device link profile detected as the device link profile to be updated, for the second device link profile created by using the second device profile.

Preferably, the device link profile creation method further includes allowing a setting, by the control unit, of the attribute information of the second device link profile created by using the second device profile.

Preferably, the device link profile creation method further includes notifying that an update of the device link profile to be updated is completed, by the control unit.

Preferably, the device link profile creation method further includes allowing a choice, by the control unit, of whether to automatically create the second device link profile by using the second device profile or not, wherein when a choice not to automatically create the second device link profile by using the second device profile is made, the control unit does not create the second device link profile by using the second device profile.

Preferably, the device link profile creation method further includes allowing a choice, by the control unit, of whether to immediately create the second device link profile by using the second device profile or not, wherein when a choice not to immediately create the second device link profile by using the second device profile is made, the control unit allows the choice again of whether to immediately create the second device link profile by using the second device profile or not, after a predetermined period of time passes.

According to another aspect of the preferred embodiments of the present invention, a computer-readable medium storing a program allows the computer to function as: a storage unit which stores a plurality of device link profiles with information about a first device profile which is used to create one of the plurality of device link profiles for each of the plurality of device link profiles, and stores the first device profile; and a control unit which performs control to: when the first device profile is updated to be a second device profile, detect the second device profile; detect a first device link profile among the plurality of device link profiles, the first device link profile being created by using the first device profile, as a device link profile to be updated; automatically create a second device link profile by using the second device profile; and update the detected device link profile to be updated by replacing the device link profile to be updated with the created second device link profile.

According to another aspect of the preferred embodiments of the present invention, a computer-readable medium storing a program allows the computer to function as: a storage unit which stores a plurality of device link profiles with information about a first device profile which is used to create one of the plurality of device link profiles for each of the plurality of device link profiles, and stores the first device profile; and a control unit which performs control to: when at least any one of the plurality of device link profiles is updated, detect the updated device link profile; when a device link profile is newly added, detect the newly-added device link profile; when the first device profile stored in the storage unit is updated to be a second device profile which is used to create the updated or the newly-added device link profile, detect the second device profile; detect a first device link profile among the plurality of device link profiles, the first device link profile being created by using the first device profile, as a device link profile to be updated; automatically create a second device link profile by using the second device profile; and update the detected device link profile to be updated by replacing the device link profile to be updated with the created second device link profile.

According to another aspect of the preferred embodiments of the present invention, a device link profile creation apparatus includes: a storage unit which stores a plurality of device link profiles with information about a first device profile which is used to create one of the plurality of device link profiles for each of the plurality of device link profiles, and stores the first device profile; and a control unit which performs control to: when the first device profile is updated to be a second device profile, detect the second device profile; detect a first device link profile among the plurality of device link profiles, the first device link profile being created by using the first device profile, as a device link profile to be updated; automatically create a second device link profile by using the second device profile; and update the detected device link profile to be updated by replacing the device link profile to be updated with the created second device link profile.

According to another aspect of the preferred embodiments of the present invention, a device link profile creation apparatus includes: a storage unit which stores a plurality of device link profiles with information about a first device profile which is used to create one of the plurality of device link profiles for each of the plurality of device link profiles, and stores the first device profile; and a control unit which performs control to: when at least any one of the plurality of device link profiles is updated, detect the updated device link profile; when a device link profile is newly added, detect the newly-added device link profile; when the first device profile stored in the storage unit is updated to be a second device profile which is used to create the updated or the newly-added device link profile, detect the second device profile; detect a first device link profile among the plurality of device link profiles, the first device link profile being created by using the first device profile, as a device link profile to be updated; automatically create a second device link profile by using the second device profile; and update the detected device link profile to be updated by replacing the device link profile to be updated with the created second device link profile.

The entire disclosure of Japanese Patent Application No. 2010-148500 filed on Jun. 30, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A device link profile creation method comprising:
   storing a plurality of device link profiles in a storage unit with information about a first device profile which is used to create one of the plurality of device link profiles, for each of the plurality of device link profiles;
   storing the first device profile in the storage unit; and
   performing control by a control unit to:
      when the first device profile is updated to be a second device profile, detect the second device profile;
      detect a first device link profile among the plurality of device link profiles, the first device link profile being created by using the first device profile, as a device link profile to be updated;
      automatically create a second device link profile by using the second device profile; and
      update the detected device link profile to be updated by replacing the device link profile to be updated with the created second device link profile;
   the device link profile creation method further comprising:
   setting an update detection rule for a device profile by allowing a choice, by the control unit, of whether to detect a device profile, creation time information of which is changed, as the second device profile, or to detect a device profile, the creation time information of which is changed, and which includes a change at a binary level after the creation time information is changed, as the second device profile, wherein
   the control unit detects an update of the first device profile into the second device profile by using the update detection rule for a device profile.

2. A device link profile creation method comprising:
   storing a plurality of device link profiles in a storage unit with information about a first device profile which is used to create one of the plurality of device link profiles, for each of the plurality of device link profiles;
storing the first device profile in the storage unit; and
performing control by a control unit to:
when at least any one of the plurality of device link profiles is updated, detect the updated device link profile;
when a device link profile is newly added, detect the newly-added device link profile;
when the first device profile stored in the storage unit is updated to be a second device profile which is used to create the updated or the newly-added device link profile, detect the second device profile;
detect a first device link profile among the plurality of device link profiles, the first device link profile being created by using the first device profile, as a device link profile to be updated;
automatically create a second device link profile by using the second device profile; and
update the detected device link profile to be updated by replacing the device link profile to be updated with the created second device link profile;
the device link profile creation method further comprising:
setting an update detection rule for a device link profile by allowing a choice, by the control unit, of whether to detect a device link profile, creation time information of which is changed, as the updated device link profile, or to detect a device link profile, the creation time information of which is changed, and which includes a change at a binary level after the creation time information is changed, as the updated device link profile, wherein
the control unit detects an update of the updated device link profile by using the update detection rule for a device link profile.

3. The device link profile creation method according to claim 1, wherein
each of the plurality of device link profiles has attribute information which is individually set; and
the control unit sets the attribute information, which is set for the first device link profile detected as the device link profile to be updated, for the second device link profile created by using the second device profile.

4. The device link profile creation method according to claim 1, further comprising allowing a setting, by the control unit, of attribute information of the second device link profile created by using the second device profile.

5. The device link profile creation method according to claim 1, further comprising notifying that an update of the device link profile to be updated is completed, by the control unit.

6. The device link profile creation method according to claim 1, further comprising allowing a choice, by the control unit, of whether to automatically create the second device link profile by using the second device profile or not, wherein
when a choice not to automatically create the second device link profile by using the second device profile is made, the control unit does not create the second device link profile by using the second device profile.

7. The device link profile creation method according to claim 1, further comprising allowing a choice, by the control unit, of whether to immediately create the second device link profile by using the second device profile or not, wherein
when a choice not to immediately create the second device link profile by using the second device profile is made, the control unit allows the choice again of whether to immediately create the second device link profile by using the second device profile or not, after a predetermined period of time passes.

8. A non-transitory computer-readable medium storing a program which allows the computer to function as:
a storage unit which stores a plurality of device link profiles with information about a first device profile which is used to create one of the plurality of device link profiles for each of the plurality of device link profiles, and stores the first device profile; and
a control unit which performs control to:
when the first device profile is updated to be a second device profile, detect the second device profile;
detect a first device link profile among the plurality of device link profiles, the first device link profile being created by using the first device profile, as a device link profile to be updated;
automatically create a second device link profile by using the second device profile;
update the detected device link profile to be updated by replacing the device link profile to be updated with the created second device link profile; and
enable setting of an update detection rule for a device profile by allowing a choice, by the control unit, of whether to detect a device profile, creation time information of which is changed, as the second device profile, or to detect a device profile, the creation time information of which is changed, and which includes a change at a binary level after the creation time information is changed, as the second device profile, wherein
the control unit detects an update of the first device profile into the second device profile by using the update detection rule for a device profile.

9. A non-transitory computer-readable medium storing a program which allows the computer to function as:
a storage unit which stores a plurality of device link profiles with information about a first device profile which is used to create one of the plurality of device link profiles for each of the plurality of device link profiles, and stores the first device profile; and
a control unit which performs control to:
when at least any one of the plurality of device link profiles is updated, detect the updated device link profile;
when a device link profile is newly added, detect the newly-added device link profile;
when the first device profile stored in the storage unit is updated to be a second device profile which is used to create the updated or the newly-added device link profile, detect the second device profile;
detect a first device link profile among the plurality of device link profiles, the first device link profile being created by using the first device profile, as a device link profile to be updated;
automatically create a second device link profile by using the second device profile;
update the detected device link profile to be updated by replacing the device link profile to be updated with the created second device link profile; and
enable setting an update detection rule for a device link profile by allowing a choice, by the control unit, of whether to detect a device link profile, creation time information of which is changed, as the updated device link profile, or to detect a device link profile, the creation time information of which is changed, and which includes a change at a binary level after the creation time information is changed, as the updated device link profile, wherein the control unit detects an update of the updated device link profile by using the update detection rule for a device link profile.

10. A device link profile creation apparatus comprising:

a storage unit which stores a plurality of device link profiles with information about a first device profile which is used to create one of the plurality of device link profiles for each of the plurality of device link profiles, and stores the first device profile; and a control unit which performs control to:

when the first device profile is updated to be a second device profile, detect the second device profile;

detect a first device link profile among the plurality of device link profiles, the first device link profile being created by using the first device profile, as a device link profile to be updated;

automatically create a second device link profile by using the second device profile;

update the detected device link profile to be updated by replacing the device link profile to be updated with the created second device link profile; and enable setting of an update detection rule for a device profile by allowing a choice, by the control unit, of whether to detect a device profile, creation time information of which is changed, as the second device profile, or to detect a device profile, the creation time information of which is changed, and which includes a change at a binary level after the creation time information is changed, as the second device profile, wherein the control unit detects an update of the first device profile into the second device profile by using the update detection rule for a device profile.

11. A device link profile creation apparatus comprising:

a storage unit which stores a plurality of device link profiles with information about a first device profile which is used to create one of the plurality of device link profiles for each of the plurality of device link profiles, and stores the first device profile; and a control unit which performs control to:

when at least any one of the plurality of device link profiles is updated, detect the updated device link profile;

when a device link profile is newly added, detect the newly-added device link profile;

when the first device profile stored in the storage unit is updated to be a second device profile which is used to create the updated or the newly-added device link profile, detect the second device profile;

detect a first device link profile among the plurality of device link profiles, the first device link profile being created by using the first device profile, as a device link profile to be updated;

automatically create a second device link profile by using the second device profile;

update the detected device link profile to be updated by replacing the device link profile to be updated with the created second device link profile; and enable setting of an update detection rule for a device link profile by allowing a choice, by the control unit, of whether to detect a device link profile, creation time information of which is changed, as the updated device link profile, or to detect a device link profile, the creation time information of which is changed, and which includes a change at a binary level after the creation time information is changed, as the updated device link profile, wherein the control unit detects an update of the updated device link profile by using the update detection rule for a device link profile.

\* \* \* \* \*